(12) United States Patent
Oh

(10) Patent No.: US 8,202,988 B2
(45) Date of Patent: Jun. 19, 2012

(54) DEGRADATION OF BROWN ALGA-DERIVED FUCOIDAN

(75) Inventor: Kyung Duk Oh, Jeju-si (KR)

(73) Assignee: Jejuaqua Trading Co., Ltd., Jeju-do (KR)

( * ) Notice: Subject to any disclaimer, the term of this patent is extended or adjusted under 35 U.S.C. 154(b) by 264 days.

(21) Appl. No.: 12/433,614

(22) Filed: Apr. 30, 2009

(65) Prior Publication Data

US 2009/0270607 A1    Oct. 29, 2009

Related U.S. Application Data

(63) Continuation of application No. PCT/KR2007/005242, filed on Oct. 24, 2007.

(30) Foreign Application Priority Data

Nov. 1, 2006  (KR) .................. 10-2006-0107251

(51) Int. Cl.
  *C07H 1/06*  (2006.01)
(52) U.S. Cl. ........................................... 536/128
(58) Field of Classification Search ............... 536/128
  See application file for complete search history.

(56) References Cited

U.S. PATENT DOCUMENTS 3,034,974 A * 5/1962 Lowry ................. 204/157.63
5,143,845 A * 9/1992 Masuda .................. 435/252.4
6,573,250 B2   6/2003 Umeda et al.

FOREIGN PATENT DOCUMENTS

| JP | 10-182703 | | 7/1998 |
| JP | 2002-165579 A | * | 6/2002 |
| KR | 2003-20064 | | 3/2003 |
| KR | 2006-514440 | | 5/2006 |

OTHER PUBLICATIONS

Morinaga, T., Araki, T., Ito, M., Kitamikado, M., Bulletin of the Japanese Society of Scientific Fisheries, 1981, 47(5), 621-625.*
Abe, J.I , Ushijima, C., Hizukuri, S, Applied and Environmental Microbiology, 1999, 65(9), 4163-4170.*
Black, W.A.P., Dewar, E.T., Woodward, F.N., J. Sci. Food Agric., 1952, 122-129.*
Sawabe, T., Setoguchi, N., Inoue, S., Tanaka, R., Ootsubo, M., Yoshimizu, M., Ezura, Y., Aquaculture, 2003, 219, 671-679.*
Chan, J.C.C., Cheung, P. C. K., Ang, P.O., J. Agric. Food Chem. 1997, 45, 3056_-3059.*
Owa, machine translation of JP2002-165579A, retrieved from the internet <http://dossier1.ipdl.inpit.go.jp/AIPN/odse__top__fwi.ipdl?N0000=7401> on Aug. 23, 2011, pp. 1-4.*
International Search Report for International Patent Application No. PCT/KR2007/005242 dated Jan. 22, 2008.

* cited by examiner

*Primary Examiner* — Eric C Olson
*Assistant Examiner* — Zhengfu Wang
(74) *Attorney, Agent, or Firm* — Knobbe Martens Olson & Bear LLP

(57) ABSTRACT

Disclosed herein are brown algae-derived fucoidan and in particular a method for degrading fucoidan to a low-molecular weight so that fucoidan as sparingly-degradable polysaccharide (M.W. 3,000,000 to 5,000,000) can be more efficiently extracted from brown algae and it can be absorbed in the human body. The method comprises preparing a fucoidan extract containing as much fucoidan as possible from brown algae selected from *Hizikia fusiforme, Undaria pinnatifida, Laminaria saccharina, Ecklonia cava, Cladosiphon Okamuranus* and *Nemacystus decipiens*, and low-molecularizating the fucoidan extract using *Vibrio halioticoli* (Accession No. KCTC 10998BP) and a probiotic mixture containing *Streptococcus faecalis, Bacillus mesentericus, Clostridium butyricum*, and glycosyltransferase thereof. According to the method, fucoidan can be efficiently degraded to a low molecular weight using microorganisms so that it can be absorbed in the human body. The fucoidan obtained realizes practical utilization of beneficial efficiencies thereof in a variety of fields, in particular, health foods, meals for patients (e.g., cancer patients), medicine, cosmetics, agriculture, fishing and stockbreeding.

9 Claims, 3 Drawing Sheets

DEGRADATION OF BROWN ALGA-DERIVED FUCOIDAN

RELATED APPLICATIONS

This application is a continuation application, and claims the benefit under 35 U.S.C. §§120 and 365 of PCT Application No. PCT/KR2007/005242, filed on Oct. 24, 2007, which is hereby incorporated by reference in its entirety. PCT/KR2007/005242 claimed the benefit of Korean Patent Application No. 10-2006-0107251 filed Nov. 1, 2006, which is hereby incorporated by reference in its entirety.

BACKGROUND

1. Field of the Invention

The present invention relates to brown algae-derived fucoidan. More specifically, the present invention relates to a method for preparing brown algae-derived fucoidan with a low-molecular weight in which fucoidan is more efficiently extracted from brown algae and then degraded to a low-molecular weight (hereinafter, the term "degraded to a low-molecular weight" and the term "low-molecularized" will be used interchangeably) so that it is readily absorbable in the human body.

2. Description of the Related Art

Brown algae-derived fucoidan is a viscous ingredient called "mucopolysaccharide" contained in brown seaweed such as *Hizikia fusiforme, Undaria pinnatifida, Laminaria saccharina, Ecklonia cava, Cladosiphon Okamuranus* and *Nemacystus decipiens*, and is composed of 2 to 4% on a dry matter basis of fibrous polysaccharide. Fucoidan contains a slight amount of proteins and lipids, but is rich in various nutrients including essential minerals (e.g., calcium and iodine) and vitamins which are beneficial to the human body. In addition, the viscous ingredient constituting fucoidan is known to contain alginate which inhibits absorption of cholesterol and laminin which has drawn a great deal of attention due to its excellent antihypertensive effect. In particular, sulfated fucose, fucose and galactose are abundant in fucoidan. Brown algae-derived fucoidan has been the focus of intense interest, since anticancer effects of sulfated fucose and fucose were reported by Japan Cancer Association in 1995. However, fucoidan is composed of sparingly-degradable polysaccharide having a high molecular weight of 3,000,000 to 5,000,000, which is impossible to digest. Thus, biodegradation (i.e., conversion from a high- to a low-molecular weight) of the fucoidan is indispensably prerequisite for practical utilization of the beneficial ingredients in the human body.

Korean Patent Registration Publication No. 1981-0000029 discloses a method for isolating and purifying fucoidan, laminarin and alginate from brown algae using phosphate. Korean Patent Publication No. 2003-0020064 discloses a fucoidan extract-containing beverage prepared by inoculating lactic acid bacteria in a fucoidan extract obtained from seaweed, followed by fermentation. However, these patents merely employ fucoidan in a beverage by improving taste or flavor of an extract which is prepared from high-molecular weight fucoidan as such or in a simple manner, thus making it difficult to realize availability, in terms of the characteristic of fucoidan whose degradation is prerequisite for its absorption in the human body.

In addition, there are brown algae-derived fucoidan products that are currently on the market. However, such a fucoidan product undergoes no suitable low-molecularization and focuses on its functionality only, thus making it difficult to ensure reliability of effects in the present state.

In order to utilize efficacies of fucoidan in the human body, the first thing to do is efficient low-molecularization of fucoidan. Recently, active studies associated with low-molecularization of fucoidan are being made by a great deal of domestic and foreign research institutions which have taken notice of the utility of fucoidan. To date, however, there is no efficient method that is capable of degrading fucoidan to a low molecular weight enough to be absorbable in the human body without causing any loss or deterioration of valuable ingredients contained in fucoidan, and furthermore enabling mass-production.

SUMMARY OF CERTAIN INVENTIVE ASPECTS

One aspect of the present invention is to provide a method for degrading fucoidan to a low molecular weight to allow the fucoidan to be absorbable in the human body, and particularly, a method for degrading fucoidan to a low molecular weight to allow the fucoidan to be absorbable in the human body with the use of microorganisms that is capable of realizing mass-production, while causing no loss or deterioration of valuable ingredients contained in the fucoidan.

As a result of repeated researches and experiments using a variety of microorganisms, the present inventors found that fucoidan can be degraded to a low molecular weight so that it is absorbable in the human body, in the case where *Vibrio halioticoli* separated and identified from brown algae is used (which is deposited at the Biological Resource Center in the Korea Research Institute of Bioscience and Biotechnology on Oct. 10, 2006 under the Accession No. KCTC 10998BP), thus finally accomplishing the present invention.

First of all, a fucoidan extract containing as much fucoidan as possible is obtained from brown algae such as *Hizikia fusiforme, Undaria pinnatifida, Laminaria saccharina, Ecklonia cava, Cladosiphon Okamuranus* and *Nemacystus decipiens*. The fucoidan extract thus obtained is degraded by fermentation with *Vibrio halioticoli* (Accession No. KCTC 10998BP). Preferably, the *Vibrio halioticoli* is used in conjunction with a probiotic mixture containing *Streptococcus faecalis, Bacillus mesentericus, Clostridium butyricum* and glycosyltransferase thereof.

In accordance with one aspect of the present invention for achieving the above aspect, there is provided a method for preparing fucoidan with a low molecular weight from brown algae, the method comprising: a) extracting fucoidan from brown algae including: washing brown algae to remove salts and foreign materials, followed by drying such that brown algae have a moisture content of 5 to 10%; crushing the brown algae, followed by roasting at 100 to 130° C. for 10 to 30 min together with stirring; adding a 5- to 15-fold weight of water to the brown algae and heat-extracting the resulting mixture at 100 to 120° C. for 3 to 6 hours to separate a fucoidan solution (as a supernatant) from a filtrate (as a solid); and heating the fucoidan solution to obtain a 7-8 brix fucoidan solution; and b) subjecting the fucoidan solution to low-molecularization including: fermenting the fucoidan solution in 0.1 to 0.2 g on a dry weight basis of a bacterial culture containing *Vibrio halioticoli* (deposited at the Biological Resource Center in the Korea Research Institute of Bioscience and Biotechnology on Oct. 10, 2006 under the Accession No. KCTC 10998BP) and a glycosyltransferase thereof for 20 min to 4 hours; and heating the resulting solution at 90 to 130° C. for 20 min to 2 hours to sterilize and inactivate the microorganisms and enzymes.

In accordance with another aspect of the present, there is provided a health food containing the low molecular weight fucoidan prepared by the method as an active ingredient.

The other aspects, features and other advantages of the present invention are encompassed in the following detailed description and will be more clearly understood from the preferred examples.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF CERTAIN INVENTIVE EMBODIMENTS

Figure 1:
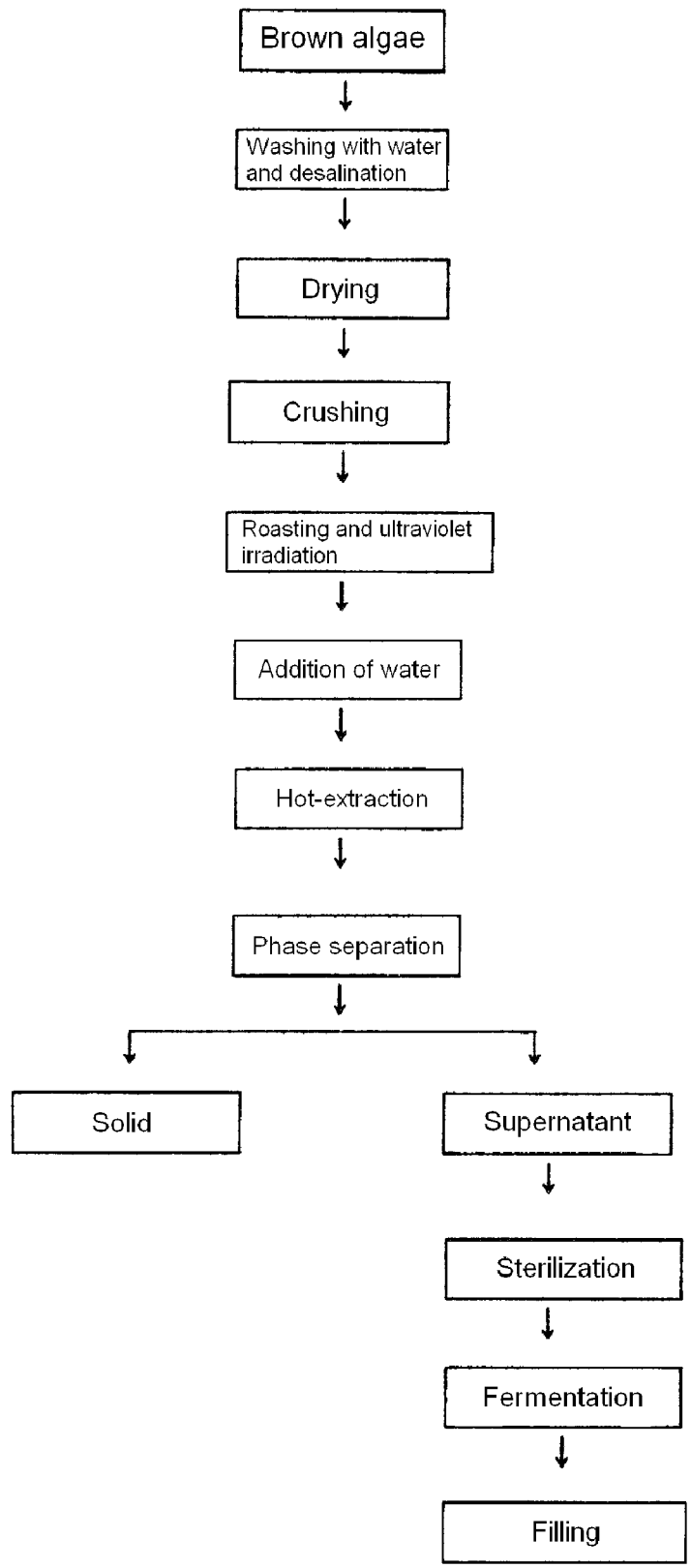
FIG. 1 is a block diagram illustrating a preferred embodiment of the method for preparing brown algae derived-fucoidan with a low molecular weight according to the present invention.

Hereinafter, the method for preparing low molecular weight fucoidan according to the present invention will be described at respective processes. FIG. 1 is a block diagram illustrating a preferred embodiment of the method for preparing brown algae derived-fucoidan with a low molecular weight according to the present invention.

Extraction of Fucoidan from Brown Algae

1. Washing and Drying of Brown Algae

Brown algae are washed with fresh water to remove salts and foreign materials. Examples of brown algae that can be used in the present invention include *Hizikia fusiforme, Undaria pinnatifida, Laminaria saccharina, Ecklonia cava), Cladosiphon Okamuranus* and *Nemacystus decipiens*, but are not necessarily limited thereto. Preferably, brown algae are dipped in fresh water for about one hour to remove foreign materials and desalt. Subsequently, the dipping of the brown algae in fresh water is repeated twice for about two to three hours to maximize the desalination. The brown algae are dried such that they have a moisture content of 5 to 10%, taking into consideration the fact that the lower the moisture content of fucoidan, the better the low-molecularization (degradation) efficiency of fucoidan, in terms of physical properties of fucoidan after removal of foreign materials and salts. The drying is preferably carried out by natural-drying using solar heat and sea wind until the brown algae are crumbly and then artificial-drying using a drier until the brown algae have a desired moisture content.

2. Crushing and Roasting

The brown algae dried in the previous process are crushed to a suitable size. Preferably, the brown algae are crushed to 50 to 100 mesh. After the crushing, the brown algae is roasted at 100 to 130° C. for 10 to 30 min with stirring so as to taste good. Preferably, at the same time, the brown algae are subjected to ultraviolet irradiation. The roasting and ultraviolet irradiation result in primary low-molecularization of fucoidan, enabling the fucoidan to have a medium-low molecular weight.

3. Heat-Extracting

A 5- to 15-fold weight of water is added to the brown algae fragments roasted in the previous process, the resulting mixture is heat-extracted at 100 to 120° C. for 3 to 6 hours and allowed to stand to separate a fucoidan solution from a filtrate.

The fucoidan solution is heated to obtain a 7-8 brix fucoidan solution. The heating is preferably carried out at about 100 to about 120° C. Preferably, prior to the following low-molecularization, the resulting fucoidan solution is subjected to sterilization. Any well-known food sterilization technique may be used in the sterilization treatment. Generally, the sterilization is carried out by heating.

Low-Molecularization of Fucoidan Solution

1. Fermentation of Fucoidan Solution in *Vibrio halioticoli* (Accession No. KCTC 10998BP)

0.1 to 0.2 g on a dry weight basis of a bacterial culture containing *Vibrio halioticoli* KCTC 10998BP and a glycosyltransferase thereof is added to 1 L of the 7-8 brix medium-low molecularized fucoidan solution thus obtained in the previous process and the mixture is fermented for 20 min to 4 hours. The *Vibrio halioticoli* used herein is a seaweed-derived microorganism which was separated and identified from brown algae by the present inventors, and then deposited at the Biological Resource Center in the Korea Research Institute of Bioscience and Biotechnology on Oct. 10, 2006 under the Accession No. KCTC 10998BP.

The fermentation is preferably carried out using 0.12 to 0.18 g on a dry weight basis of the bacterial culture at 33 to 37° C., more preferably at 35° C., for one to two hours. The fermentation period is preferably 20 min to 4 hours, but may be prolonged or shortened, if necessary. Through the present fermentation process and the next fermentation process using the probiotic, the medium-low molecularized fucoidan is subjected to further degradation and therefore low-molecularized to be suitable for being absorbable in the human body.

2. Fermentation of Fucoidan Solution in Probiotic

Preferably, to 1 L of the fucoidan solution is added 0.1 to 0.2 g of a probiotic containing *Streptococcus faecalis, Bacillus mesentericus* and *Clostridium butyricum*, each of which has a content of $1.0 \times 10^6$/g to $1.0 \times 10^9$/g on a dry weight basis, and the mixture is fermented for 2 to 6 hours. The probiotic used in one embodiment of the present invention is Probiotics Powder Complex (available from TOA PHARMACEUTICAL, Co., Ltd., Japan), but probiotics suitable for use in the present invention are not limited thereto. Any probiotic may be used without particular limitation so long as it contains the three kinds of microorganism strains, each of which is in an amount not less than $1.0 \times 10^6$/g.

The amount of microorganisms contained in the probiotic is preferably each in a range of $1.0 \times 10^6$ to $1.0 \times 10^9$/g, more preferably $1.0 \times 10^7$ to $1.0 \times 10^8$/g. The amount (on a dry weight basis) of the probiotic added is 0.1 to 0.2 g, preferably 0.12 to 0.18 g, with respect to 1 L of the fucoidan solution. The probiotic preparation comprises not only microorganisms, but also enzymes (particularly, glycosyltransferases) thereof. Thus, the use of the probiotic preparation enables introduction of glycosyltransferases in conjunction with the microorganisms into the fucoidan solution, thus eliminating the necessity of using glycosyltransferases separately.

The fermentation time is preferably about 2 to 6 hours, but may be prolonged or shortened, if necessary. Through the previous fermentation process using *Vibrio halioticoli* and the present fermentation process, the medium-low molecularized fucoidan is subjected to further degradation and therefore ultra-low molecularized to be suitable for being absorbed by the human body.

Preferably, the low-molecularization of fucoidan is adjusted to a level in which 70% or more of the total mass of fucoidan has a molecular weight not more than 100,000 and 50% or more of the fucoidan has a molecular weight not more than 10,000. More preferably, the low-molecularization of fucoidan is adjusted to a level in which 80% or more of the total mass of fucoidan has a molecular weight not more than 100,000 and 40% or more of the fucoidan has a molecular weight not more than 1,000.

3. Sterilization and Inactivation of Microorganisms and Enzymes

After completion of the fermentation, the resulting solution is heated at 90 to 130° C. for 20 min to 2 hours to sterilize and inactivate the microorganisms and enzymes. Preferably, the low-molecularized fucoidan solution is filled into a vial, hot-water sterilized under the conditions of temperature and reaction time as defined above and cooled in cooling water. As a result, the fermentation process is discontinued and low-molecularization of fucoidan is completed.

The low-molecularized fucoidan obtained through a series of the processes is formulated in the form of a powder, a granule or an extract, and may be thus used not only as health foods, but also as active ingredients of medicine, cosmetics and functional feedstuffs.

Hereinafter, preferred embodiments of the present invention will be explained. However, these embodiments are given for the purpose of illustration and are not intended to limit the present invention. Those skilled in the art will appreciate that various modifications, additions and substitutions are possible, without departing from the scope and spirit of the invention as disclosed in the accompanying claims.

EXAMPLES

Example

1. Extraction of Fucoidan from Brown Algae 1) 3 kg of each of four brown algae (in total 12 kg), i.e., *Hizikia fusiforme*, *Undaria pinnatifida*, *Laminaria saccharina* and *Ecklonia cava*, put on the market in Jeju-do, Korea, was dipped in fresh water for about two hours to remove foreign materials and desalt. Subsequently, the dipping of the brown algae in fresh water was sequentially carried out for about two hours and then for about three hours to maximize the desalination.

2) The brown algae were natural-dried using solar heat and sea wind until the brown algae were crumbly and then artificial-dried using a drier until the humidity of the brown algae was adjusted to 6%.

3) The brown algae were crushed to 50 to 100 mesh.

4) The resulting brown algae were roasted at 120° C. for 20 min with stirring, and at the same time, subjected to ultraviolet irradiation to allow degradation of fucoidan to a medium-low molecular weight.

5) The roasted brown algae were put in an extraction bag and water was added thereto. The mixture was heated in a high-pressure extractor at 105° C. for 5 hours to extract fucoidan from the brown algae.

6) After completion of the extraction, the mixture was allowed to stand to separate a fucoidan solution (i.e., a supernatant) from a filtrate (i.e., a solid). The supernatant was collected and heated at 110° C. for 2 to 5 hours to obtain a 7 brix fucoidan solution.

2. Low-Molecularization of Fucoidan Solution 1) 8 g on a dry weight basis of a bacterial culture containing *Vibrio halioticoli* (Accession No.: KCTC 10998BP) and a glycosyltransferase thereof was added to 50 L of the 7 brix fucoidan solution thus obtained in the previous process and the mixture was fermented for 90 min with stirring.

2) Subsequently, the fucoidan solution was fermented in 8 g of Probiotics Powder Complex (available from TOA PHARMACEUTICAL, Co., Ltd., Japan) composed of $2.4 \times 10^8$/g *Streptococcus feacalis* T-110, $6.7 \times 10^8$/g *Bacillus mesentericus* TO-A and $1.1 \times 10^7$/g *Clostridium butyricum* TO-A for 3 hours.

3) After completion of the fermentation, the resulting fucoidan solution was heated for one hour to sterilize and inactivate the microorganisms and enzymes, thereby obtaining low-molecularized fucoidan.

Test Example

The molecular-weight distribution of the low-molecularized fucoidan was measured by size exclusion chromatography using a TSKgel GMPW$_{XL}$ column. This test was conducted by Japan Food Research Laboratories.

1. Test Method

1) Preparation of Standard Solution

Molecular-weight standard products (e.g., pullulan) as set forth in Table 1 were each dissolved in a 0.1 mol/L sodium acetate solution to prepare 0.05 W/V % standard solutions.

TABLE 1

| No. | Standard Products | Molecular weight |
|---|---|---|
| 1 | P-1600* | 1,600,000 |
| 2 | P-400* | 404,000 |
| 3 | P-200* | 212,000 |
| 4 | P-50* | 47,300 |
| 5 | P-20* | 22,800 |
| 6 | P-5* | 5,900 |
| 7 | P-1* | 1,300 |
| 8 | Maltotriose | 504 |

*Shodex standard P-82 (available from Showa Denko K.K.)

2) Preparation of Test Solution

A sodium acetate solution (0.1 mol/L, 10 mL) was added to 0.5 g of the low-molecularized fucoidan prepared in Example above. The mixture was stood at ambient temperature for one night and heated in boiling water for 10 min. After allowing to cool, the mixture was filtered through a 0.45 μm membrane filter to obtain a test solution.

3) Measurement of Molecular Weight Distribution.

The standard and test solutions were injected into a high performance liquid chromatographic system using a size exclusion column. The results were analyzed by a 480 II data station GPC program (System Instruments CO., LTD.). The estimation of the molecular weight corresponding to each peak was carried out using a calibration curve (shown in FIG. 3) which was plotted based on the elution time and the molecular weight of the molecular-weight standard products.

2. Results

Figure 2:
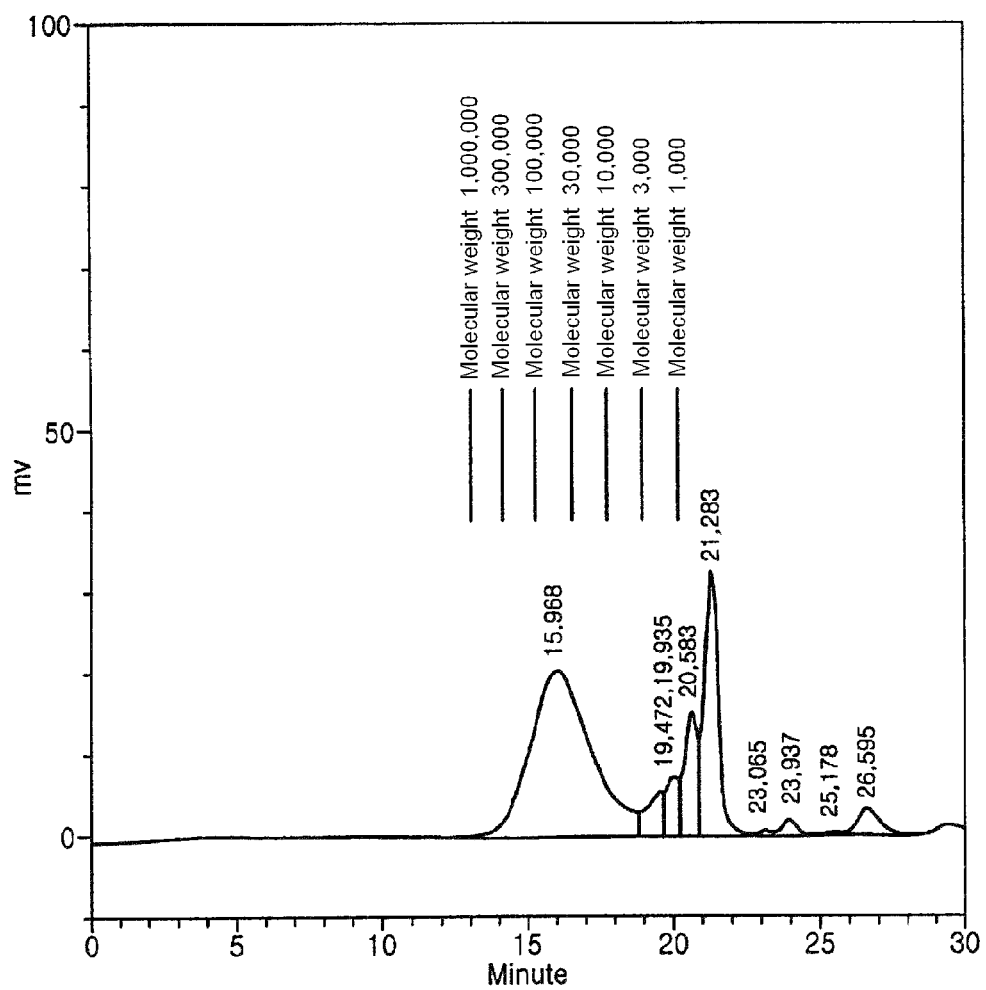
FIG. 2 is a chromatogram showing molecular-weight distribution of low-molecularized fucoidan measured by size exclusion chromatography.
Figure 3:
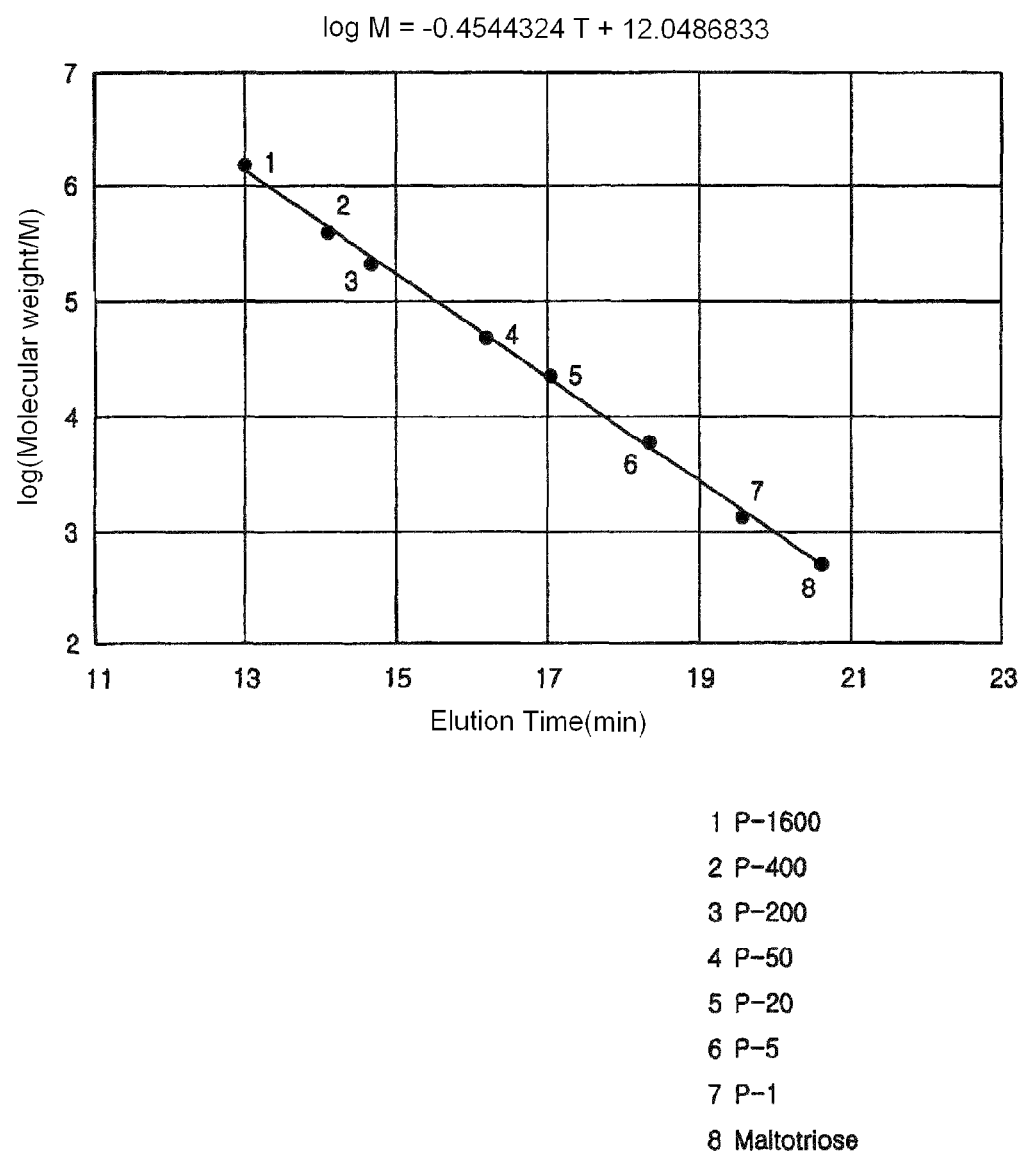
FIG. 3 is a graph showing correlation between elution time and molecular weight obtained on the basis of chromatograms of molecular-weight standard products.

The results of the molecular weight distribution measurement are shown in Table 2. The obtained chromatogram is shown in FIG. 2. A graph showing correlation between the elution time and the molecular weight obtained on the basis of the chromatogram of the molecular-weight standard products is shown in FIG. 3.

TABLE 2

| Molecular Weight Range | Peak area (%) |
|---|---|
| 1,000,000 or more | Trace |
| 300,000 to 1,000,000 | 2 |
| 100,000 to 300,000 | 13 |
| 30,000 to 100,000 | 24 |

TABLE 2-continued

| Molecular Weight Range | Peak area (%) |
|---|---|
| 10,000 to 30,000 | 13 |
| 3,000 to 10,000 | 5 |
| 1,000 to 3,000 | 6 |
| 1,000 or less | 37 |
| Total | 100 |

As apparent from the foregoing, according to the described methods, fucoidan can be efficiently degraded to a low molecular weight using microorganisms so that it can be absorbed in the human body. In addition, the method enables preparation of a high yield of low-molecularized fucoidan from brown algae. The fucoidan obtained enables practical utilization of beneficial efficiencies thereof in a variety of fields, in particular, health foods, meals for patients (e.g., cancer patients), medicine, cosmetics, agriculture, fishing and stockbreeding.

While the above description has pointed out novel features of the invention as applied to various embodiments, the skilled person will understand that various omissions, substitutions, and changes in the form and details of the device or process illustrated may be made without departing from the scope of the invention. Therefore, the scope of the invention is defined by the appended claims rather than by the foregoing description. All variations coming within the meaning and range of equivalency of the claims are embraced within their scope.

What is claimed is:

1. A method for preparing brown algae-derived fucoidan compositions, the method comprising:
    a) extracting fucoidan from brown algae including:
        washing brown algae to remove salts and foreign materials, followed by drying such that brown algae have a moisture content of 5 to 10%;
        crushing the brown algae, followed by roasting at 100 to 130° C. for 10 to 30 min together with stirring to provide roasted brown algae;
        adding a 5- to 15-fold weight of water to the roasted brown algae and heat-extracting the resulting mixture at 100 to 120° C. for 3 to 6 hours to separate the supernatant comprising fucoidan from the solid filtrate; and
        heating the supernatant comprising fucoidan to obtain a 7-8 brix fucoidan solution; and
    b) subjecting the 7-8 brix fucoidan solution to low-molecularization to a point where at least 70% of fucoidan molecules have a molecular weight of 100,000 or less and at least 50% of fucoidan molecules have a molecular weight of 10,000 or less; including:
        fermenting 1 L of the 7-8 brix fucoidan solution in 0.1 to 0.2 g on a dry weight basis of a bacterial culture containing *Vibrio halioticoli*, Accession No. KCTC 10998BP, and a glycosyltransferase thereof for 20 min to 4 hours; and
        heating the resulting solution at 90 to 130° C. for 20 min to 2 hours to sterilize and inactivate the *Vibrio halioticoli* and the glycosyltransferase.

2. The method according to claim 1, wherein the brown algae is selected from *Hizikia fusiforme, Undaria pinnatifida, Laminaria saccharina, Ecklonia cava, Cladosiphon Okamuranus, Nemacystus decipiens* and a mixture thereof.

3. The method according to claim 1, further comprising:
    after the step of fermenting the 7-8 brix fucoidan solution in the bacterial culture containing said *Vibrio halioticoli*, adding a probiotic containing *Streptococcus faecalis, Bacillus mesentericus* and *Clostridium butyricum*, each having a content of $1.0 \times 10^6$/g to $1.0 \times 10^9$/g on a dry weight basis, to the 7-8 brix fucoidan solution in an amount of 0.1 to 0.2 g per liter of the 7-8 brix fucoidan solution, followed by fermentation for 2 to 6 hours to degrade the fucoidan to a point at which at least 80% of fucoidan molecules have a molecular weight 100,000 or less, and at least 40% of fucoidan molecules have a molecular weight of 1,000 or less.

4. The method according to claim 3, wherein the brown algae is selected from *Hizikia fusiforme, Undaria pinnatifida, Laminaria saccharina, Ecklonia cava, Cladosiphon Okamuranus, Nemacystus decipiens* and a mixture thereof.

5. The method according to claim 3, wherein the fermentation is carried out using 0.12 to 0.18 g on a dry weight basis of the bacterial culture at 33 to 37° C. for one to two hours.

6. The method according to claim 5, wherein the brown algae is selected from *Hizikia fusiforme, Undaria pinnatifida, Laminaria saccharina, Ecklonia cava, Cladosiphon Okamuranus, Nemacystus decipiens* and a mixture thereof.

7. The method according to claim 5, wherein the roasting is carried out together with ultraviolet irradiation.

8. The method according to claim 5, wherein the probiotic contains *Streptococcus faecalis, Bacillus mesentericus* and *Clostridium butyricum* each in an amount of $1.0 \times 10^7$/g to $1.0 \times 10^9$/g on a dry weight basis.

9. The method according to claim 6, wherein the brown algae is selected from *Hizikia fusiforme, Undaria pinnatifida, Laminaria saccharina, Ecklonia cava, Cladosiphon Okamuranus, Nemacystus decipiens* and a mixture thereof.

* * * * *